(12) United States Patent
Laudenklos

(10) Patent No.: US 8,685,155 B2
(45) Date of Patent: *Apr. 1, 2014

(54) COATING OF A FUNCTIONAL COMPONENT THAT IS SUBJECT TO THERMAL LOADS AND EROSION, MOLD-RELEASE AGENT AND METHOD FOR PRODUCING SAID COATING

(75) Inventor: Manfred Laudenklos, Schoeneck (DE)

(73) Assignees: KS Aluminium-Technologie GmbH, Neckarsulm (DE); Gelita AG, Eberbach (DE)

( * ) Notice: Subject to any disclaimer, the term of this patent is extended or adjusted under 35 U.S.C. 154(b) by 1104 days.

This patent is subject to a terminal disclaimer.

(21) Appl. No.: 12/089,424

(22) PCT Filed: Sep. 7, 2006

(86) PCT No.: PCT/EP2006/008750
§ 371 (c)(1),
(2), (4) Date: Aug. 19, 2010

(87) PCT Pub. No.: WO2007/028621
PCT Pub. Date: Mar. 15, 2007

(65) Prior Publication Data
US 2010/0304129 A1    Dec. 2, 2010

(30) Foreign Application Priority Data
Sep. 7, 2005   (DE) .......................... 10 2005 042 474

(51) Int. Cl.
*C10M 173/02*   (2006.01)

(52) U.S. Cl.
USPC ......... 106/36; 106/38.2; 106/38.22; 508/161; 508/162

(58) Field of Classification Search
None
See application file for complete search history.

(56) References Cited

U.S. PATENT DOCUMENTS

| | | |
|---|---|---|
| 3,248,249 A | 4/1966 | Collins |
| 4,981,518 A | 1/1991 | Sachs |
| 2003/0158316 A1 | 8/2003 | Vanier et al. |
| 2004/0138058 A1 | 7/2004 | Sambasivan et al. |
| 2009/0283014 A1* | 11/2009 | Schichtel et al. ........ 106/287.13 |

FOREIGN PATENT DOCUMENTS

| | | |
|---|---|---|
| DE | 1 030 377 | 5/1958 |
| DE | 1 264 924 | 3/1968 |
| DE | 1 519 391 | 1/1971 |
| DE | 24 34 098 | 1/1976 |
| DE | 34 03 660 A1 | 8/1985 |
| DE | 196 29 399 A1 | 1/1998 |
| DE | 101 24 434 A1 | 11/2002 |
| DE | 699 08 837 T2 | 5/2004 |
| EP | 273 698 B1 | 7/1988 |
| EP | 0 846 506 A1 | 6/1998 |
| EP | 1 153 999 A1 | 11/2001 |
| FR | 1 342 178 | 11/1963 |
| GB | 1 303 665 | 1/1973 |
| WO | WO 2004/050377 | 6/2004 |
| WO | WO 2005/005034 A2 | 1/2005 |
| WO | WO 2006070021 A1 * | 7/2006 |

* cited by examiner

*Primary Examiner* — Monique Jackson
(74) *Attorney, Agent, or Firm* — Muncy, Geissler, Olds & Lowe, P.C.

(57) ABSTRACT

The invention relates to a metallic functional component, which is subject to thermal or thermal and erosive stress and to which on at least one surface a coating is applied, whereby the coating consists of a binder phase, which consists at least largely of a phosphate, and a material embedded in the binder phase. In addition, the invention relates to a separating agent for preparing a layer of this type, and to a method for applying the coating to a functional component.

11 Claims, No Drawings

COATING OF A FUNCTIONAL COMPONENT THAT IS SUBJECT TO THERMAL LOADS AND EROSION, MOLD-RELEASE AGENT AND METHOD FOR PRODUCING SAID COATING

This application is a national stage of International Application No. PCT/EP2006/008750, which was filed on Sep. 7, 2006, and which claims priority to German Patent Application No. DE 10 2005 042 474.0, which was filed in Germany on Sep. 7, 2005, and which are both herein incorporated by reference.

The invention relates to a metallic functional component, which is subject to thermal or thermal and erosive stress and to which on at least one surface a coating is applied, whereby the coating consists of a binder phase, which consists at least largely of a phosphate, and a material embedded in the binder phase. In addition, the invention relates to a separating agent for preparing a coating on a functional component, and in addition to a method for producing a coating on a metallic surface of a functional component.

Components that are exposed to thermal or thermal and erosive stress and through which a medium flows or which are impinged by or exposed to a medium fulfill, for example, the task of power transmission or a conductive surface. In this function, they are exposed to flowing or expanding media. In many cases, considerable temperature variations occur thereby, so that the components must meet the condition of temperature resistance. In many cases, deposits also occur in components in contact with flowing media, so that these components are generally provided with coatings. Typical examples of functional components of this type are, for example, pistons, cylinder heads, and the entire area of the exhaust gas recirculation system in a motor vehicle. Apart from the erosive stress on these components, these components are also subjected to high thermal stress and temperature variations. Highly different coatings and coating methods are known for protecting functional components of this type.

Unexamined German Patent Application No. DE 101 24 434 A1 discloses a method for producing a coating and a coating for metals or metal alloys such as steel, sintered metals, or aluminum alloys from the sectors of automotive and mechanical engineering. The purpose of this coating is to protect said materials from wear and corrosion. The coating in this case consists of an inorganic matrix phase, which consists at least largely of a phosphate and a material embedded therein. In an embodiment, the coating consists of an inorganic matrix phase of aluminum phosphate, in which materials, such as, for example, aluminum oxide or graphite, are embedded. Coatings of this type are preferably applied over water-based gels or dispersions of dissolved monoaluminum phosphate and powdered functional materials dispersed therein onto the substrate to be coated, dried, and baked in an oven at typical temperatures of 150° C. to 500° C.

Another coating for aluminum materials is known from German Patent Publication No. DE 699 08 837 T2. The coating here relates to the surface of a piston skirt, which has a hard anodized coating and a composite polymer coating applied to the hard anodized coating. The composite polymer coating comprises a plurality of solid and lubricating particles in a heat-resistant polymer matrix, which can withstand engine operating temperatures. The known lubricant materials, graphite, boron nitride, molybdenum, etc., are used in this case as lubricants.

The object of the present invention is to develop a coating of thermally or thermally and erosively stressed functional surfaces on components, which involves chemical binding to the base material of the functional component and therefore opposes the erosive and thermal stresses on the functional components. In addition, the coating should be easy to apply and exhibit high adhesion to the base material. Moreover, the object of the invention is to provide a separating agent for preparing a layer of this type, which is economical to produce and easy to apply. Another object of the invention is to provide a method which is capable of producing such a layer and which produces high adhesion between the binder and the base material.

The object of the invention is attained in regard to the functional component provided with a coating to the effect that the binder phase is bound chemically to the base material of the functional component and that the binder phase is formed of a polymer of polymerized monoaluminum phosphate and/or monozinc phosphate and/or monomagnesium phosphate and/or sodium phosphate and/or boron phosphate, and the functional component is part of an internal combustion engine, and the material embedded in the binder phase is a structural part in the form of $Al_2O_3$ and/or $SiO_2$ and/or $TiO_2$ and/or $ZrO_2$ in a fraction of 80 nm to 200 nm and the material embedded in the binder phase is formed of primary parts in the form of $Al_2O_3$, $SiO_2$, ZnO, $ZrO_2$, CeO, and $TiO_2$ in a fraction of 2 nm to 80 nm, whereby the primary parts are inserted in the gaps between the structural parts and the primary parts and the structural parts are surrounded by the polymer, and at least traces of an organic binder, preferably of gelatin, are detectable in the coating. The use according to the invention of a binder phase of polymerized phosphates now makes it possible to produce chemical binding to the base material, and therefore to create an adherent layer on the functional component. Such coatings increase the lifetime of the functional components and, with improved action, reduce the laborious and cost-intensive use of methods to improve thermal shock behavior of the base materials. Furthermore, deposits are avoided by means of the layer of the invention; this in turn serves to reduce motor vehicle emissions.

Structural parts in the form of $Al_2O_3$ and/or $SiO_2$ and/or $TiO_2$ and/or $ZrO_2$ are integrated into the binder phase. In this case, the polymer chains surround the structural parts and bind the structural parts to the base material. In this case, the phosphate combines chemically with iron present in the base material or a nonmetal such as. An adherent layer is also produced by diffusing the binder into the base material. The degree of infiltration in this case depends on the bulk density of the base material and on the degree of porosity in each case.

An adherent layer is thereby produced on the functional component, which provides great certainty against erosive stresses by means of chemical binding to the base material and the inclusion of the structural elements in the polymer chains. In this case, the hard structural parts, present as oxides, are used as a "wear substrate" and the binder phase as binders between the base material and structural element. The structural parts are present in a fraction of 80 nm to 200 nm and with up to 10% by weight form the largest amount of particle-like materials in the coating. The structural parts have a relatively coarse surface structure, so that, in one respect, the structural parts interlock with one another and simultaneously assure a good hold in the binder phase.

Advantageously and essential to the invention, the binder phase has an amount of primary parts in the form of $Al_2O_3$ and/or $SiO_2$ and/or ZnO and/or $TiO_2$ and/or $ZrO_2$ and/or CeO. The primary parts are inserted in the gaps between the structural parts. In particular, because of the size of the primary parts of 2 nm to 80 nm, the primary parts are optimally suited to function as fillers between the structural parts. A very smooth surface results, which in turn counteracts erosion and deposition of soot particles impacting the functional part and present in, for example, an exhaust gas of an exhaust gas recirculation channel. The very smooth and resistant surface therefore facilitates the advantage of the invention that the functional components provided with a coating of the invention have a long lifetime. The primary parts are preferably present in the coating in amounts of 1% by weight to 3% by weight.

The use of an organic and/or inorganic dispersant is also to be regarded as essential. A gelatin, sold under the trade name "Gelita," is used in particular. The main components of this gelatin are calcium with a content of 3950 mg per kg and magnesium with a content of 1500 mg per kg; the remainder consists of organic and inorganic components. The gelatin preferably has the task of contributing concertedly to a potential equalization during dispersing and for accelerating the reaction. To explain the potential equalization of gelatin in the binder phase, reference is made herewith to the Richardson-Ellingham diagram, which is known, on the one hand, and from which the potential differences of the individual employed chemical compounds can be read off, on the other. Magnesium and calcium as main components of gelatin are used hereby to stabilize the structural parts and the primary parts during solubilization of the hot base material by the coating, so that control of the binding of the coating to the base material is possible. Gelatin is present in the separating agent in amounts of 0.5% by weight to 5% by weight and is thereby detectable at least in trace amounts in the coating of the functional component.

In another advantageous embodiment variant of the invention, sliding parts in the form of boron nitride and/or magnesium aluminum silicate and/or molybdenum disulfide and/or silicate minerals, for example, mica, are integrated into the binder phase. The sliding parts are present in the coating in amounts of up to 5% by weight. The much larger sliding parts with expansions of 2 μm to 15 μm are also held by the polymer chains of the polymerized phosphate or lie between the structural parts in the coating.

Thicknesses between 1 μm and 80 μm are provided preferably as layer thicknesses. Preferably, a thickness between 25 μm and 60 μm is built up on the surface of the functional component. Functional components are, for example, components such as pistons, a cylinder head, or parts of the exhaust gas recirculation system in a motor vehicle. In this case, the functional components are made of aluminum alloys or steel. It is also possible to form a coating of the invention on a functional component made of cast iron, particularly cast iron in the form of GG, GGG, and GGV.

The object of the invention is attained in regard to the separating agent for preparing a coating on a functional component to the effect that the separating agent is formed of deionized water and contains the following components:
an acid buffer in the form of a sodium hydroxide solution and/or potassium hydroxide solution and/or aluminum chloride, and
a phosphate-containing binder in the form of monoaluminum phosphate and/or monozinc phosphate and/or monomagnesium phosphate and/or sodium phosphate and/or boron phosphate,
an organic and/or inorganic dispersant, such as, for example, gelatin,
an amount of structural parts in the form of $Al_2O_3$ and/or $SiO_2$ in a fraction of 80 nm to 200 nm,
an amount of primary parts in the form of $Al_2O_3$ and/or $SiO_2$ and/or ZnO and/or $TiO_2$ and/or $ZrO_2$ and/or $CeO$ in a fraction of 2 nm to 80 nm.

It is possible according to the invention by means of the acid buffer to adjust the acid content and thereby the pH of the separating agent and thereby to control the polymer reaction rate and formation. The acid buffer thereby serves to delay the reaction and allows for a uniform reaction course. Preferably, a pH of 4 to 5 is established in the separating agent. It is now possible with the use of the separating agent to produce a coating according to certain aspects of the present invention. In a preferred embodiment, structural parts and primary parts are present in the separating agent, said parts which are applied to the surface of the material of the functional component by spraying or dipping of the functional component. It is also advantageous to introduce sliding parts in the form of boron nitride and/or magnesium aluminum silicate and/or molybdenum disulfide into the separating agent. The fractions of the structural parts in this case range from 80 nm to 200 nm, that of the primary parts from 2 nm and 80 nm, and that of the sliding parts from 2 μm and 15 μm. Gelatin which forms nanoparticles independently is advantageous in this case. Binders in an amount of up to 5% by weight are added to the separating agent. The structural parts are added to the separating agent with up to 10% by weight, the primary parts up to 3% by weight, and the sliding parts in an amount of up to 5% by weight.

As a result of the targeted selection of the addition of the structural parts and primary parts and optionally the sliding parts and the binder, the separating agent has a high liquidity and can be sprayed by simple means, for example, on the surface of the functional component.

In regard to the method for producing the coating on a surface of the functional component, the coating of the invention is produced by first providing the surface with a separating agent and then heating the functional component to a temperature of at least 200° C., so that chemical binding of the phosphate to the base material and polymerization of the binder occur. Advantageously, the heating is produced by means of a high-frequency electric field that is applied, for example, capacitively or inductively to the functional component. The surface can be heated very uniformly by this direct warming up, as occurs, for example, during inductive heating. Preferred frequency ranges for heating by means of a high-frequency electric field in this case are 100 kHz up to 10 MHz, about 4 MHz being used preferably. During heating at 4 MHz, a penetration depth of the phosphate of 0.2 to 0.3 mm therefore results. A very well adhering coating is thereby produced on the functional component.

The polymer chains are used, on the one hand, to hold the layer together and, on the other, they are advantageous because they grow during thermal stress and therefore increase the elasticity of the layer. During cyclic thermal stress, therefore, no premature component failure occurs due to crack formation in the coating, because the coating of the invention can follow the expansions of the base material elastically. A temperature resistance up to about 1300° C. can be achieved by the layer structure of the invention. The employed phosphate binder systems have a polymerization temperature of about 220° C. and a vitrification point of 830° C. The adhesion to the base material is hereby also assured in the nearly vitrified or vitrified state by the chemical binding to the base material. Preferably, attention must be paid to the fact that the operating temperatures in the area of application of the functional components are below the vitrification point, so that the coatings in the elastic range and therefore in their coefficient of expansion are similar to that of the base material.

The invention claimed is:

1. A separating agent for preparing a coating on a functional component, wherein the separating agent is formed of deionized water and contains at least the following components:
   an amount of a sodium hydroxide solution or potassium hydroxide solution or aluminum chloride, or a mixture of sodium hydroxide, potassium hydroxide solution and aluminum chloride,
   a phosphate-containing binder in the form of monoaluminum phosphate or monozinc phosphate or magnesium phosphate or manganese phosphate or boron phosphate, or a mixture of monoaluminum phosphate, monozinc phosphate, magnesium phosphate, manganese phosphate, and boron phosphate,
   an amount of structural parts in the form of $Al_2O_3$ or $SiO_2$ or a combination of $Al_2O_3$ and $SiO_2$, the structural parts having a size in a range of 80 nm to 200 nm, and
   an amount of primary parts in the form of $Al_2O_3$ or $SiO_2$ or ZnO or $TiO_2$ or $Zro_2$ or CeO or a combination of $Al_2O_3$, $SiO_2$, ZnO, $TiO_2$, $ZrO_2$, and CeO, the primary parts having a size in a range of 2 nm to 80 nm, and an amount of an organic or inorganic dispersant.

2. The separating agent according to claim 1, wherein an amount of sliding parts in the form of boron nitride or magnesium aluminum silicate or molybdenum disulfide or a combination of boron nitride, magnesium aluminum silicate, and molybdenum disulfide, the sliding parts having a size in a range of 2 µm to 15 µm is present in the separating agent.

3. The separating agent according to claim 1, wherein the separating agent has a pH of 4 to 5.

4. The separating agent according to claim 1, wherein the amount of the binder in the separating agent is greater than 0% by weight and less than or equal to 5% by weight of the separating agent.

5. The separating agent according to claim 1, wherein the amount of the structural parts in the separating agent is greater than 0% by weight and less than or equal to 10% by weight of the separating agent.

6. The separating agent according to claim 1, wherein the amount of the primary parts in the separating agent is greater than 0% by weight and less than or equal to 3% by weight of the separating agent.

7. The separating agent according to claim 1, wherein the amount of the sliding parts in the separating agent is greater than 0% and less than or equal to 5% by weight of the separating agent.

8. The separating agent according to claim 1, further comprising an amount of gelatin in the separating agent between 0.5% by weight and 5% by weight of the separating agent.

9. The separating agent according to claim 8, wherein calcium and magnesium are present in the gelatin.

10. The separating agent according to claim 1, wherein the dispersant comprises gelatin.

11. The separating agent according to claim 1, wherein the amount of the primary parts in the separating agent is between 1% by weight and 3% by weight of the separating agent.

* * * * *